United States Patent [19]

Pyle

[11] 3,938,965
[45] Feb. 17, 1976

[54] PROCESS FOR PRODUCING SOLID INDUSTRIAL FUEL

[75] Inventor: Owen Pyle, Anchorage, Ky.

[73] Assignee: The Kingsford Company, Louisville, Ky.

[22] Filed: Apr. 5, 1973

[21] Appl. No.: 347,993

Related U.S. Application Data

[63] Continuation-in-part of Ser. No. 275,366, July 26, 1972, and a continuation-in-part of Ser. No. 279,767, Aug. 11, 1972, which is a continuation-in-part of Ser. No. 271,795, July 14, 1972.

[52] U.S. Cl.......................................... 44/1 C; 44/1 F
[51] Int. Cl.² ............................................. C10L 9/08
[58] Field of Search............ 44/1 A, 1 E, 1 F, 10 C, 44/10 B, 10 F, 10 K, 1 C

[56] References Cited
UNITED STATES PATENTS

| 914,248 | 3/1909 | Damon | 44/10 F |
|---|---|---|---|
| 1,420,165 | 6/1922 | Trent | 44/1 A |
| 1,856,357 | 5/1932 | Placek | 44/10 E |

FOREIGN PATENTS OR APPLICATIONS

| 333,811 | 8/1930 | United Kingdom | 44/10 F |

Primary Examiner—Carl F. Dees
Attorney, Agent, or Firm—LeBlanc & Shur

[57] ABSTRACT

An improved process for producing solid fuel from woody materials, which fuel may be characterized as having a low and relatively nonabrasive ash, is described. The process includes the steps of carbonizing the woody materials to form charcoal; cooling, conditioning and stabilizing the charcoal; crushing the charcoal typically to a particle size that will pass through about a 16 mesh or finer screen, beneficating the crude crushed charcoal by separating, on the basis of density, a dense fraction which may constitute from about 5 to 25 or more weight percent of the crude charcoal; and subsequently milling the beneficated product, if desired, to form a powdered fuel, or for compacting to make barbeque briquettes.

7 Claims, 2 Drawing Figures

PROCESS FOR PRODUCING SOLID INDUSTRIAL FUEL

This application is a continuation-in-part of my copending application Ser. No. 279,767, filed Aug. 11, 1972, entitled PROCESS FOR PRODUCING SOLID INDUSTRIAL FUEL which application in turn is a continuation-in-part of my copending application Ser. No. 271,795 filed July 14, 1972, entitled PROCESS FOR PRODUCING INDUSTRIAL FUEL FROM WASTE WOODY MATERIALS. This application is also a continuation-in-part of my copending application Ser. No. 275,366 filed July 26, 1972 and entitled EFFICIENT PRODUCTION OF BRIQUETTE QUALITY CHARCOAL IN MULTIPLE HEARTH FURNACES.

This invention relates to the production of fuel, and specifically to an improved process for the preparation of solid, low-sulfur, fuel which will produce a relatively nonabrasive ash, when burned. In addition, this invention relates to a relatively pollution-free method for disposing of waste woody vegetable materials by converting these materials to industrial fuel which can be burned without creating appreciable sulfur dioxide or noxious or visible smoke, and will produce a relatively nonabrasive ash which can be economically collected with conventional emission control devices. This invention also relates to lowering the ash content of charcoal for the production of barbeque briquetts.

The term "woody" is employed herein broadly to include vegetable materials characterized by a cellulosic fibre structure. The term is intended to include materials such as bark, twigs, sawdust, nut shells such as walnut shells, fruit pit shells such as almond shells and peach pit shells, pods and hulls such as peanut shells, cobs and the like. The term is also intended to include processed cellulosic material such as molded pulp containers, corrugated paper board, paper, softboard, hardboard, extracted stumps, bagasse, rope, jute and other carbonizable scrap of vegetable origin.

One method for disposing of waste woody materials is to burn the materials and use them to produce steam. For example, green bark, sawmill wastes, or the by-products of paper making operations are commonly used as fuel in bark boilers. However, bark boilers are inefficient and have the additional disadvantage of emitting a highly abrasive fly ash. If the ash is not collected in the boiler stack a serious air pollution problem may result.

Modern air emission standards now require the use of expensive devices on the boiler stacks to control fly ash emissions. These devices typically include a plurality of relatively small cyclones arranged either in series or in parallel to separate the entrained ash from the stack gases.

Although cyclone-type devices may be highly efficient, in actual practice when operated at an efficiently high gas velocity the abrasive quality of the ash collected causes excessive wear and requires frequent maintenance and shut-down. Accordingly, the operation of emission control devices on conventional burners, fueled by waste woody materials, may be characterized by unacceptably high maintenance costs and down-time.

It is possible to operate these control systems under less than optimum conditions and thereby reduce the ash abrasion. For example, if the pressure differential through a cyclone system is lowered, less ash abrasion and lower maintenance costs will result. The efficiency, however, will also be reduced. Accordingly, in many installations pollution control devices are operated under minimum conditions with the emissions therefrom at or near the level of noncompliance. Even so, these devices remain expensive to operate primarily because of the abrasive quality of the ash generated in the boiler.

In my aforementioned parent application Ser. No. 271,795 there was described a process whereby waste woody vegetable materials are initially dried, until the moisture content therein is less than about 15%, and subsequently carbonized in, for example, a multiple hearth furnace. These materials are thereby used to produce a solid industrial fuel, charcoal, and an off-gas which may have a fuel value similar to or higher than producer gas. The charcoal is then pulverized, if desired, and cooled, and conditioned against spontaneous combustion. The charcoal may be used to adsorb the combustible condensible matter in the gas to produce an enriched charcoal and a relatively noncorrosive fuel gas. In the alternative, pulverized charcoal may be entrained in the gas and conveyed to a burner for use as an enriched fuel gas.

Accordingly, the disclosure of my U.S. Patent Application Ser. No. 271,795 is hereby incorporated by reference.

In my prior Application Ser. No. 279,767 a process for producing solid, low sulfur industrial fuel having a fuel value similar to bituminous coal was described. The process includes the steps of initially drying waste woody materials, and subsequently subjecting said materials to limited carbonization in, for example, a multiple hearth furnace only until noticeable carbonization begins and the fibrous structure of the materials disappears. This process maximizes the fuel value of the solid charcoal produced and produces only a minimum quantity of off-gas. The invention described in the aforementioned application was also directed to production of a relatively pollution-free industrial fuel from waste woody materials which could then be burned as fuel without creating appreciable sulfur dioxide, or noxious or visible smoke. The term "pyrochar" was employed therein to include, broadly, a charcoal as well as partially carbonized woody material, pyrolyzed at least sufficiently to destroy its fibrous character. The term is applicable to a product of carbonization having a relatively high content of volatile combustible matter, but which may be pulverized by conventional milling techniques.

The process of this prior patent application also includes the step of initially drying the waste woody materials and then feeding the dried materials into a furnace or kiln for carbonization. However, in my last mentioned prior application limited carbonization is used to produce Pyrochar in high yields. The Pyrochar produced is then quench-cooled and conditioned against spontaneous combustion, and may subsequently be compacted for shipment or pulverized for immediate use as a powdered fuel. This process produces only a negligible or limited amount of off-gas useful as fuel for the drier, as desired.

Accordingly, the disclosure of my U.S. Pat. Application Ser. No. 279,767 is hereby incorporated by reference.

In my prior Application Ser. No. 275,366 there was described an efficient and economical process for producing briquette quality charcoal, having from about ten percent to no more than about 23 percent volatile combustible matter, from particulate vegetable material in a multiple hearth furnace. If the vegetable material has a high moisture content the process includes the step of initially drying the materials so that the feed to the multiple hearth furnace has a moisture content of no more than about 20 percent and preferably about 5 to 10 percent.

The materials are then carbonized in the furnace under a controlled draft whereby the furnace pressure is maintained in the range of from 0.5 inches of water negative gauge pressure to zero to produce high yields of small-particle charcoal and an off-gas having a fuel value of at least 130 B.t.u. per standard cubic foot. The charcoal is then immediately stabilized against spontaneous combustion by quench cooling and conditioning with agitation. The off-gas is available for use as a fuel.

Accordingly, the disclosure of my U.S. Pat. Application Ser. No. 275,366, filed July 26, 1972 is hereby incorporated by reference.

Although it has been known that dense foreign matter in waste woody materials is primarily responsible for the abrasive quality of the fly ash produced when the materials are consumed, an economical process for reducing the abrasiveness of the ash has not been forthcoming. For example, green bark contains inherent as well as adherent sand and other foreign materials which can not be separated therefrom before the bark is charged to the burner. The inherent portion has been deposited as the tree has grown in cracks, pin-holes, crevices, and wounds in the bark by wind, water and other means. Subsequent growth of the tree has thereafter occluded the deposits. Sawdust, another common waste used as a fuel, may have dense foreign materials such as sand mixed therein. These materials have not been removed economically by prior processes before the sawdust is burned.

However, it has now been discovered that the carbonization processes of my aforementioned applications may be adapted according to this invention to produce a fuel with low abrasive ash. After initially carbonizing waste woody materials, the dense fraction of foreign materials may be conveniently separated from the fuel fraction which may then be used as a low-sulfur fuel to produce, when consumed, ash having a low abrasive quality.

Specifically, the process of this invention may be adapted to utilize charcoal from any conventional carbonizer such as a multiple hearth furnace. The charcoal may be lumps or fines from carbonizing of waste woody materials. When the charcoal leaves the carbonizer it is first cooled and conditioned against spontaneous combustion and then admitted to a conventional crusher. In the crusher, the crude charcoal is crushed until a major portion will pass through an approximately 16 mesh or finer U.S. Standard sieve. It should be noted, however, that the crude lump charcoal should not be crushed to a particle size distribution smaller than one retaining at least five percent on a 100 mesh screen because, as will be subsequently explained, a finer consistency may involve pulverizing the abrasive foreign particulate matter, thereby making it relatively more difficult to separate.

The crushed, crude charcoal is then classified in any well known classifier to discard, on the basis of density, the denser fraction containing most of the highly abrasive foreign materials. Examples of classifiers which could be used are air flow separators, air classifiers, gravity separators, fluidized bed elutriators and centrifugal separators. It is preferred, however, to use an air classifier unless dust explosions are a hazard. If so, flue gas from the carbonizer could be used in the classifier.

Depending upon the parent wood and on the extent of its carbonization, the particle density or specific gravity of the charcoal may vary from about 0.3 grams per cubic centimeter (g/cc.) to more than about 0.8 g/cc. Likewise, depending also on particle size, size distribution, and the degree of compaction, the bulk density of charcoal may vary from about 10 lbs. per cubic foot to more than about 40 lbs. per cubic foot.

In general, the dense fraction of crushed crude charcoal to be eliminated may be characterized, after carbonization, as particles having an average density of at least about 1 g/cc. Typically the bulk density of the dense fraction to be discarded, which constitutes from 5 to 25 percent of the crude charcoal, is about 50 lbs. per cubic foot or more.

The beneficated charcoal may then be compacted to form barbeque briquettes, or burned directly in a conventional bark boiler in place of the green bark charge. In the alternative, it may be burned in a powdered fuel burner as desired.

The powdered fuel formed by the improved process of this invention may be described as a low-sulfur, non-polluting fuel having a high fuel value, equivalent, depending upon the carbonization process employed, to that of some bituminous coals. But most importantly, the fuel will be consumed to produce only an ash having a relatively low abrasive characteristic. The fuel produced according to the improved process of this invention then is adaptable to a variety of different types of burner operations wherein nonpolluting, economical fuel is desired.

Accordingly, it is an object of this invention to provide an improved and economical process for producing fuel from woody materials.

It is another object of this invention to provide a process for producing virtually nonpolluting solid industrial fuel from waste woody materials, which fuel, when burned in conventional equipment, will emit a fly ash which may be economically collected from stack gases with conventional emission control devices.

It is yet another object of this invention to provide a process for reducing the abrasiveness of fly ash resulting from the combustion of charcoal to thereby provide a virtually nonpolluting solid fuel which, when consumed, produces a fly ash which may be economically collected without undue abrasive wear to the collection equipment.

It is yet another object of this invention to provide a process for reducing the abrasiveness of the fly ash resulting from the combustion of waste woody materials so that the ash may be economically collected from boiler stack gases.

It is yet another object of this invention to provide an improved process for producing virtually nonpolluting solid industrial fuel from waste woody materials, which fuel is characterized by producing a relatively nonabrasive fly ash, when consumed, which process includes the steps of predrying the materials, carbonizing the materials to produce crude charcoal, crushing the charcoal, beneficating the crude charcoal in a classifier to separate, on the basis of density, a dense fraction, and collecting the beneficated charcoal product.

It is still another object of this invention to provide an improved process for producing virtually nonpolluting, solid industrial fuel from waste woody materials, which process includes the steps of predrying the woody materials, if necessary to reduce the moisture content thereof to less than about 15 percent; subjecting said materials to at least a limited carbonization until the fibrous structure therefrom is destroyed; crushing the crude charcoal produced by carbonization, if necessary to provide crude charcoal having a particle size which will pass through an approximately 16 mesh or finer screen, separating from said crude charcoal, on the basis of density, a dense fraction constituting from about 5 to about 25 percent by weight thereof; collecting the charcoal product for use as an industrial fuel which will produce, when consumed, a relatively nonabrasive fly ash which may be economically and efficiently collected from boiler and other furnace stack gases.

It is still another object of this invention to provide an improved process for producing briquette quality charcoal having a low ash content from waste woody materials, which process includes the steps of carbonizing said materials in a multiple hearth furnace under a controlled draft to produce crude charcoal, stabilizing said charcoal against spontaneous combustion, crushing the charcoal, beneficating the crude charcoal to separate, on the basis of density, a dense fraction, and compacting said beneficated charcoal to form barbeque briquettes.

These and other objects will become readily apparent with reference to the drawings and following description wherein.

Figure 1:
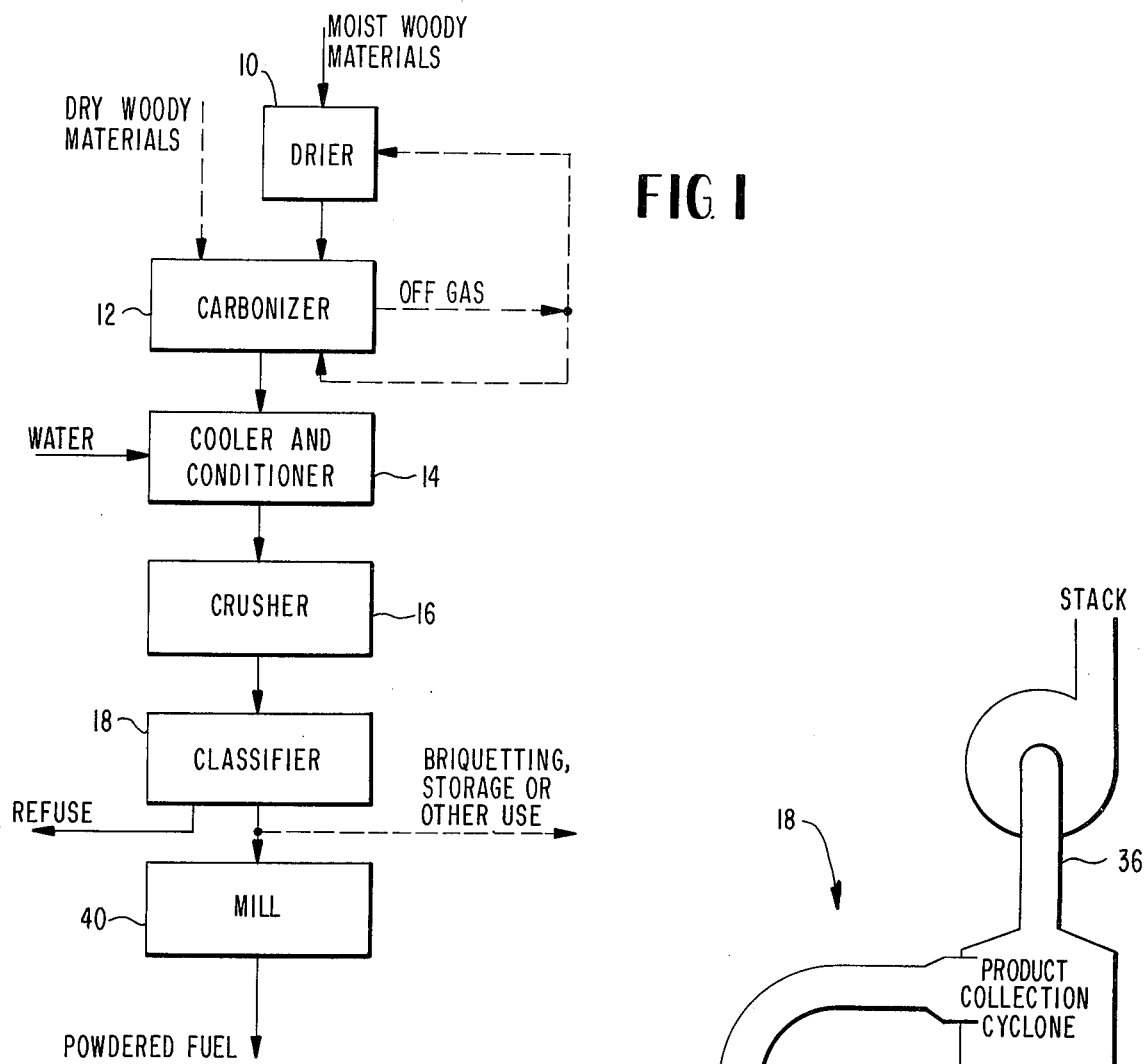
FIG. 1 is a block diagram illustrating a preferred flow sheet for the improved process of this invention.

With reference to the drawings, and in particular to the flow sheet of FIG. 1, the raw materials for the process of this invention may be, as stated, any woody vegetable materials such as bark, chips, sawdust, twigs, plantation waste, bagasse, paper, hulls, cobs and shells. For use in the process of this invention the feed materials may be in any convenient form from particles such as sawdust to flat slab-like pieces several inches in diameter. However, if the pieces are very thick, they should be comminuted before being admitted to the carbonizer.

If the woody waste materials have a moisture content of over about 15 percent, they are initially fed into a dryer 10 and the moisture content is lowered therein to less than 15 percent or preferably from 5 to 10 percent. It is not essential to the process of this invention that the materials be completely dry before carbonization.

Any well known drying implement capable of continuous operation may be used within the scope of this invention. However, a rotary dryer using hot fuel gas from the subsequent carbonization process is preferred.

The foregoing, of course, will be obviated if the raw materials to be carbonized are not moist. For example, carbonizable nut shells, pits, and hulls may be nearly completely dry. Therefore, when these materials are utilized in the process of this invention, a predrying step is unnecessary.

The dried materials are then fed into a carbonizer 12. The carbonizer may be any conventional device such as a shaft or rotary kiln, a rotary hearth furnace or a fluidized bed, but typically is a multiple-hearth furnace as disclosed in my aforementioned U.S. patent applications.

Carbonization is allowed to proceed in carbonizer 12 according to any well known technique. If desired, however, the temperature and residence time may be strictly controlled as disclosed in my aforementioned Application Ser. No. 279,767, to produce Pyrochar and a minimum quantity of off-gas. The off-gas from the carbonization process then may be returned to the dryer as fuel and/or used in the carbonizer.

In the alternative, carbonization may be allowed to proceed as described in my Applications Ser. Nos. 271,795 and 275,366 to produce charcoal having a volatile combustible matter content of either about 23 percent or more. To achieve this volatile combustible matter content, either the residence time in the carbonizer or the carbonization temperature, or both, are controlled in a well known manner within the skill of an ordinary practitioner in the art.

When the volatile combustible matter content is as high as indicated, the charcoal produced will be sufficiently flammable to be used in powdered form as an extremely efficient and economical industrial fuel. This process will also produce a quantity of off-gas having a fuel value similar to producer gas. A portion of this gas may be returned directly to the dryer, as fuel, or as will be subsequently explained, the condensible combustible matter in the gas may be adsorbed onto the charcoal to reduce the corrosiveness of the gas and produce an excellent low B.t.u. fuel gas.

The crude charcoal or Pyrochar resulting from carbonization is preferably quench-cooled and conditioned, by agitation, against spontaneous combustion. This procedure may be accomplished in any well known device 14, or the crude charcoal may be quench-cooled and conditioned as it is conveyed from the carbonizer 12 to crusher 16.

The crusher may be any conventional crushing device such as, for example, a Raymond roller mill. However, as stated, the crude charcoal should be crushed to a consistency of no finer than that which will pass through about an 80 mesh screen. It has been discovered that the abrasive dense fraction of the crude charcoal, after carbonization, will consist primarily of particulate matter having a natural particle size that will be retained on a 80 mesh or coarser U.S. Standard sieve. Accordingly, the dense fraction may be more efficiently separated if the particles thereof are not crushed.

In the event the raw materials for the process of this invention are particulate matter such as sawdust, the crushing step will obviously be unnecessary.

Therefore, if the crude charcoal is fines or small particulate matter, after stabilizing, it will be conveyed directly to classifier 18.

It should be noted, however, that when charcoal is made by pyrolysis in a fluidized bed the dense fraction may be merely elutriated from the fluidizing bed. Accordingly, in this case the steps of crushing and classifying according to the process of this invention are performed in the carbonizer.

Although "classification" may refer to solids separation on the basis of particle size, classification equipment is employed in the process of this invention to separate particles on the basis of density. Inertia rather than particle size is used then to beneficate the crude charcoal from crusher 16.

A wide variety of well known types of classifiers may be utilized to beneficate the crude crushed charcoal. Examples thereof include C-E Bauer Specific Gravity Separators, C-E Raymond Mechanical Air Separators, Sapic Elutriators, Witte Vibrating Air Screens (fluid bed). Air flow separators are available from, for example, Sutton, Steel & Steel, of Dallas, Texas. Air classifiers may be obtained from C.E. Raymond Company division of Combustion Engineering, Chicago, Illinois, and other gravity separators may be obtained from The Forsberg Line, Thief River Falls, Minnesota.

Accordingly, it will be understood that this invention is not intended to be limited to the specific type of classification equipment described herein, but, as will be obvious to those skilled in the art, may include any well known device capable of beneficating particulate solids on the basis of density.

Figure 2:
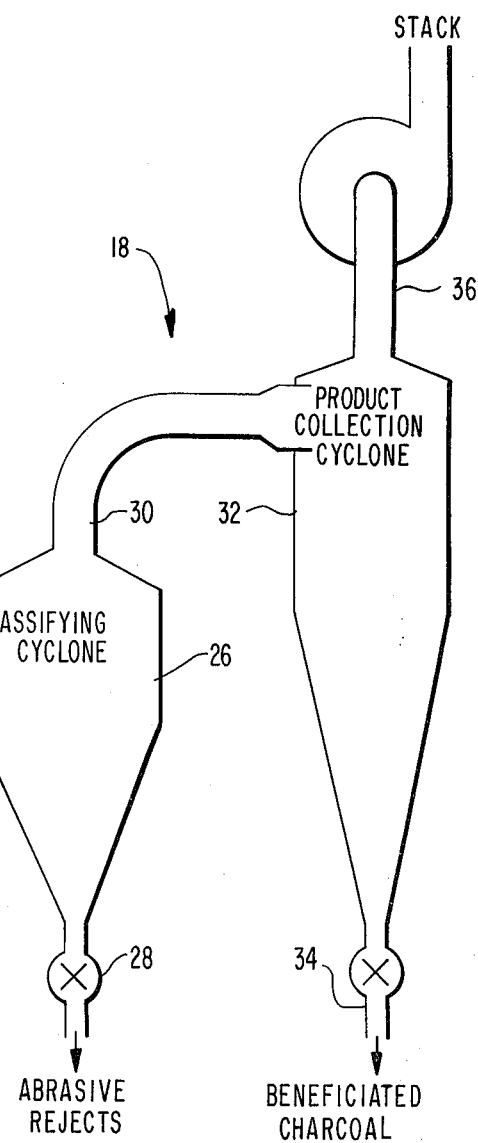
FIG. 2 is a schematic diagram showing certain important features of classifying equipment which may be used in an embodiment of this invention.

FIG. 2 illustrates, schematically, a simple cyclone classifier system which may be utilized according to this invention as follows:

The crude crushed charcoal feed is admitted to the classifying system 18 at inlet 20. The feed is conveyed by, for example, air conveyor 22 through inlet 24 into a first classifying cyclone 26.

Air may be utilized to entrain the particulate crude charcoal feed. However, in the event dust explosions may be a problem, flue gas from the carbonization process may be utilized alternatively to entrain the crude charcoal particles for classification.

Cyclone 26 is designed to operate inefficiently by dust collection standards because most of the charcoal must pass through it with only a dense fraction of about 5 to 25 percent rejected. The air or gas velocity in classifying cyclone 26 may be as low as will keep the entrained charcoal suspended, e.g., 30 feet per second, to minimize abrasion therein.

Depending upon the raw materials utilized, the abrasive rejects will, as noted above, constitute approximately 5 to 25 percent by weight of the crude charcoal feed. Accordingly, classifying cyclone 26 is designed to separate the abrasive rejects from the feed, and said rejects leave cyclone 26 at outlet 28. The less dense entrained charcoal particles then pass through conveying means 30 to a product collection cyclone 32.

The final or product collection cyclone 32 should be a very efficient total solids separator, employing relatively high velocities, e.g., 65 feet per second. The beneficated product is then collected at outlet 34, and the entraining air or gas exits cyclone 32 at a stack 36. This discharging gas may be further cleaned to meet emission standards in, for example, a baghouse collector (not shown).

Although two cyclones are described and shown in the embodiment of FIG. 2, it will be obvious to those skilled in the art that a plurality of small cyclones may be employed in series and/or in parallel to separate out the beneficated product. In the alternative, a more sophisticated mechanical separator may be utilized such as a Raymond Double Whizzer Air Separator commonly employed in the benefication of certain materials such as talc, kaolin, clays and phosphate rock to remove silica, flint and the like therefrom.

The beneficated charcoal exiting the classifier 18 is then available for briquetting, storage or other use, or it may be conveyed to a mill 40 such as a Raymond roller mill where it is pulverized for use as a powdered fuel. As noted in my Application Ser. No. 271,785, the classified charcoal may be conveyed to a suitable adsorber (not shown) wherein the combustible condensible matter from the off-gas is adsorbed onto the charcoal to form an enriched solid fuel.

The condensible matter in the off-gas may include corrosive acids. The presence of these acids in the off-gas creates storage and transportation problems if the gas is not handled in expensive corrosion resistant equipment. The acids, however, have good fuel values, and therefore it is essential to an efficient process for using the potential fuel value of the raw materials carbonized that these acids are retained in the fuel produced.

In the alternative, as also disclosed in my Application Ser. No. 271,785, when the charcoal enters the mill 40 where it is pulverized it may be entrained in an off-gas from the carbonizer to form an enriched fuel gas. The enriched fuel gas may then be conveyed directly from the mill to a burner (not shown) to form a virtually non-polluting energy source.

Finally, in the event the raw materials have been subjected to only a limited carbonization to form Pyrochar as described in my pending Application Ser. No. 279,767, the beneficated Pyrochar from classifier 18 may also be pulverized in mill 40 to form a powdered fuel. In the alternative, the Pyrochar may be conveyed to a suitable compacting device (not shown) such as a briquetting machine or an extruder to produce a compacted product for transport.

As noted in my above-mentioned prior application Pyrochar, when cooled, will not compact well without a binder. However, when the pyrochar is at a temperature of about 200°F. or more it may be efficiently compacted without adding binding material.

In conclusion, an improved process for removing foreign matter from waste woody materials and for producing a fuel which, when consumed, will produce a relative low and/or nonabrasive ash, has been described. The process includes the steps of carbonizing woody materials to produce crude charcoal; cooling and conditioning the charcoal against spontaneous combustion; crushing the charcoal, if necessary to produce particles which will pass through from about 16 to an 80 mesh screen; and subsequently beneficating said crude charcoal to separate a dense fraction therefrom.

Crude charcoal particles may be beneficated in any of a wide variety of well known commercially available classifiers designed to separate, on the basis of density, a dense fraction which constitutes from about 5 to 25 percent of the crude charcoal by weight. The abrasive foreign matter in the crude charcoal has been found to have a bulk density of about 50 lbs. per cubic foot or more. This is contrasted with a bulk density of charcoal varying from about 10 to about 40 lbs. per cubic foot.

Accordingly, when the dense abrasive fraction has been removed from the crude charcoal, the beneficated product is available for use as a fuel. When the beneficated charcoal is consumed it will produce a relatively nonabrasive ash which may be economically collected from stack gases by any well known emission control device without an unacceptably high amount of wear thereto.

While the improvement of this invention is particularly suited for use in the processes of my above-mentioned prior applications to produce a fuel having relatively low nonabrasive ash, it may be adapted to any carbonization process, as will be obvious to those skilled in the art, to produce charcoal having a volatile combustible matter content of up to around 23 percent, enriched charcoal having a volatile combustible matter content of up to around 30 percent, or Pyrochar.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for producing a substantially pollution-free fuel from moist woody vegetable materials comprising the steps of:

continuously supplying said materials to dryer; drying said materials until the moisture content thereof is less than approximately 15 percent; admitting said dried materials to a carbonizer; pyrolyzing said materials in said carbonizer to form crude charcoal and a fuel gas therefrom; collecting at least a major portion of the fuel gas and charcoal formed; cooling and conditioning said charcoal against spontaneous combustion; crushing said charcoal until it will pass through an approximately 16 mesh U.S. Standard sieve but no finer than will just pass through about an 80 mesh sieve; beneficating said crude charcoal in a classifier and removing a dense fraction having a bulk density of at least about 50 lbs. per cubic foot therefrom to form a beneficated fuel which will produce, when burned, low relatively nonabrasive ash.

2. The process of claim 1 further comprising conveying said gas and beneficated charcoal through a mill; pulverizing said charcoal in said mill; and entraining said pulverized charcoal in said gas to form an enriched fuel gas.

3. The process of claim 1 further comprising collecting said beneficated charcoal; collecting at least a major portion of said fuel gas; admitting said gas and said charcoal to an adsorber; cooling said gas in said adsorber and allowing the condensible combustible matter therein to adsorb on said charcoal to form an enriched solid fuel.

4. The process of claim 3 further comprising the steps of:
collecting said gas after the condensible combustible matter therein has been adsorbed on said charcoal; collecting said enriched, beneficated charcoal; pulverizing said collected charcoal to form a solid powdered fuel.

5. The process of claim 1 further comprising the step of pulverizing said beneficated charcoal in a mill to produce a powdered fuel.

6. The process of claim 1 wherein said woody materials are pyrolyzed in said carbonizer at least until the fibre structure thereof is destroyed to form crude Pyrochar.

7. The process of claim 6 wherein the step of removing the dense fraction comprises separating from 5 to about 25 percent by weight of said crude Pyrochar therefrom.

* * * * *